Oct. 14, 1930.  T. H. DONAHUE  1,778,292
PROCESS OF REFINING BISMUTH
Filed July 8, 1929
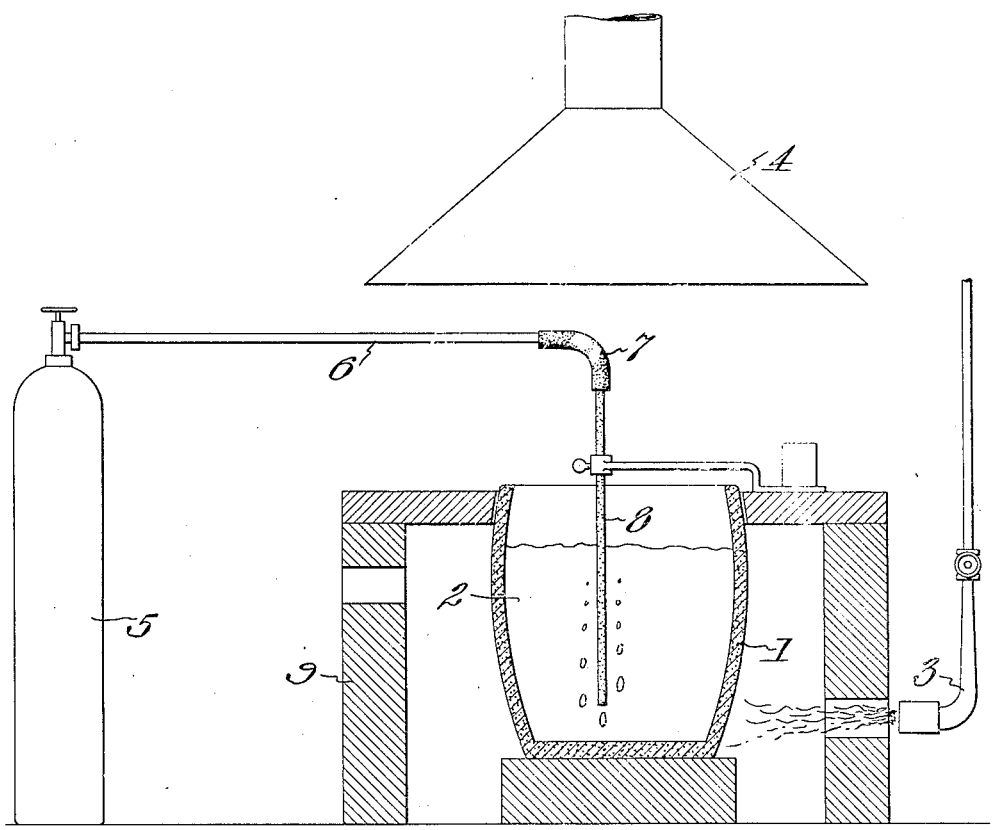
Inventor:
Thomas H. Donahue
By Byrnes Townsend & Brickenstein
Attorneys.

Patented Oct. 14, 1930

1,778,292

UNITED STATES PATENT OFFICE

THOMAS H. DONAHUE, OF EAST CHICAGO, INDIANA, ASSIGNOR OF ONE-HALF TO CERRO DE PASCO COPPER CORPORATION, OF NEW YORK, N. Y., A CORPORATION OF NEW YORK

PROCESS OF REFINING BISMUTH

Application filed July 8, 1929. Serial No. 376,680.

This invention relates to a process of refining metallic bismuth.

Crude bismuth produced from ores or as a by-product from various metallurgical operations, such as the electrolytic refining of lead or tin, is usually contaminated with various metallic impurities. The object of this invention is to provide a simple and economical process of removing certain of these impurities.

The process consists in contacting the molten impure bismuth with chlorine gas. The chlorine combines with impurities such as aluminum, zinc, cadmium, tin, lead, etc., which possess an appreciably greater heat of combination with chlorine than does bismuth. The anhydrous chlorides of the impurities rise to the surface of the metal bath and form a fluid slag, or if of low boiling point may volatilize. The chlorination is continued until the chlorine begins to combine with the bismuth. The slag is separated and then the molten purified metal may be further treated with caustic soda for the purpose of removing any chlorine which may be retained in the metal.

The process may be carried out with any suitable form of apparatus. One form of apparatus which has been found to be satisfactory is illustrated diagrammatically in the accompanying drawing in which 1 is a crucible containing the impure metal 2. The crucible is set in a furnace 9 which is heated, for example, by means of a gas or oil burner 3. A ventilating hood 4 is provided above the crucible for removing fumes. The chlorine gas is drawn from a cylinder 5, containing chlorine under pressure, through a pipe 6 and a rubber connection 7 to a porcelain tube 8 extending nearly to the bottom of the crucible.

A graphite crucible has been found to be the most satisfactory. Iron is rapidly corroded by the slag. Fire clay and similar ceramic materials are not only fragile but the slag will "wet" them and seep through, causing annoying fumes. The tubes for introducing the chlorine may be made of graphite or preferably porcelain, which does not break so readily. Iron piping may be used from the chlorine cylinders to the porcelain tube. The connection between the iron pipe and the porcelain tube is best made of heavy rubber tube in order to give a flexible connection and protect the tube against shock. The chlorine gas flowing through the tube will keep the rubber cool, but in the course of time will harden the same.

The following specific example illustrates the application of the process to the removal of lead from bismuth. Bismuth is found frequently associated with lead, and since one of the principal uses of bismuth is in medicine, it is essential that lead be entirely removed.

A charge of crude bismuth weighing 1,200 pounds containing lead as an impurity was melted in a crucible and the temperature increased to about 1200° F. The porcelain tube was introduced and the chlorine turned on, the pressure in the cylinders serving to force the gas into the metal. The lead reacted with the chlorine to produce lead chloride in accordance with the reaction: $Pb + Cl_2 \rightarrow PbCl_2$. The lead chloride produced floated to the surface and formed a highly fluid slag. The addition of chloride was continued until clouds of white fumes appeared, which indicated that the lead was completely removed and the chlorine was reacting with the bismuth. A total of 130 pounds chlorine was added and 525 pounds slag was removed. The residual metal in the crucible was molded out and weighed 800 pounds. The following analyses show the effectiveness of the treatment:

| Per cent | Crude metal | Treated metal | Slag |
|---|---|---|---|
| Pb | 32.03 | Less than 0.001 | 73.00 |
| Bi | 67.45 | ------------ | 1.76 |
| Cl | ----- | ------------ | 24.90 |

The reactions are very rapid and the chlorine can be added at a high rate without any appreciable amount escaping. As much as 10 pounds chlorine per hour may be added through one tube, and this rate may be multiplied by using additional tubes. If more than one tube is used, each tube should be attached to a separate chlorine cylinder, as it is very difficult to submerge different tubes to the same depth. This rapid addition of chlorine stirs the metal very efficiently and no further provision for stirring is needed. The end point of the reaction is determined by the appearance of clouds of white fume and an odor of hydrochloric acid. This indicates that the chlorine is reacting with bismuth to produce bismuth trichloride which is immediately volatilized. The white clouds are probably due to the reaction between the bismuth trichloride and moisture in the atmosphere giving rise to a hydrogen chloride smoke according to the reaction:

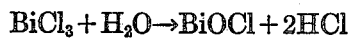

$$BiCl_3 + H_2O \rightarrow BiOCl + 2HCl$$

The molten purified bismuth apparently retains a certain amount of chlorine in solution, in much the same manner that molten copper retains oxygen in solution. In order to remove this chlorine the metal is remelted and about 1% by weight of caustic soda is added. The caustic soda is melted and stirred into the metal and then allowed to float to the surface and is skimmed off.

During the treatment with chlorine, the temperature must be high enough to maintain the metal and slag in the molten state. With this exception the process is not limited to any particular temperature. In general, temperatures ranging from 900° to 1500° F. have been found to be satisfactory.

It is to be understood that the process is not limited to the use of the specific apparatus or method of operation which have been described by way of illustration. Any form of suitable apparatus may be employed. The chlorine gas for the reaction may be derived from any convenient source. There does not appear to be any limit to the amount of impurity which may be present in the metal undergoing treatment. Other impurities not mentioned may be present and can be removed by the same procedure. I do not wish to limit the invention to the removal of the specific impurities cited as examples.

I claim:

1. The process of refining impure bismuth which comprises contacting the molten metal with chlorine gas and removing the chlorides produced.

2. The process of refining impure bismuth which comprises bubbling chlorine gas through a bath of the molten metal and removing the chlorides produced.

3. The process of refining bismuth containing lead which comprises contacting the molten metal with chlorine gas and removing the lead chlorides produced.

4. The process of refining impure bismuth which comprises contacting the molten metal with chlorine gas, removing the chlorides produced and treating the purified molten metal with caustic alkali.

5. A process for removing lead and/or zinc from a molten bismuth alloy which comprises passing a halogen gas into said molten alloy and separating the resultant metallic halides from the purified bismuth.

6. A process for removing lead and/or zinc from a molten bismuth alloy which comprises passing chlorine gas into said molten alloy and separating the resultant metallic chlorides from the purified bismuth.

In testimony whereof, I affix my signature.

THOMAS H. DONAHUE.